L. S. SCHMIDT.
WELDED JOINT.
APPLICATION FILED DEC. 15, 1914.
1,158,307.
Patented Oct. 26, 1915.
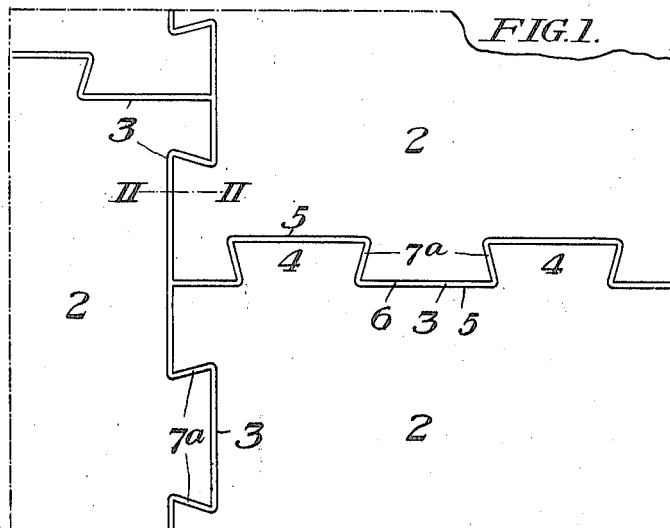
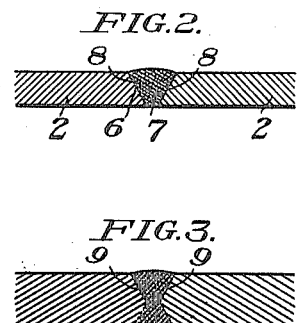
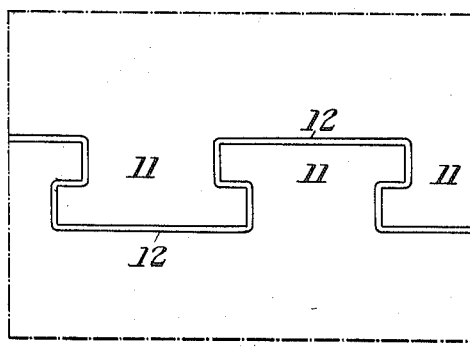
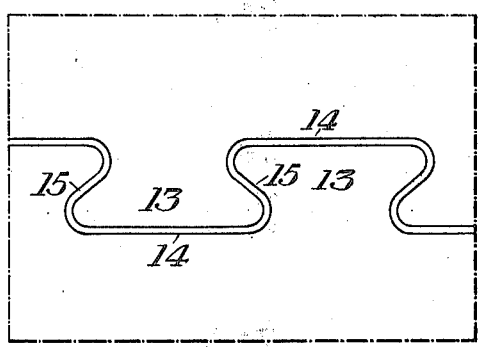
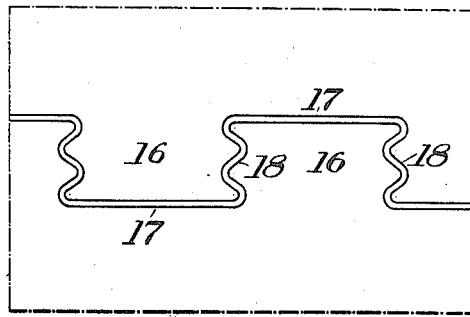
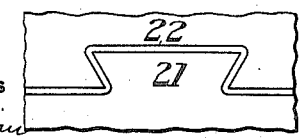
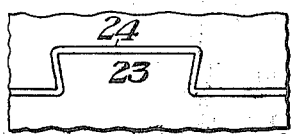
WITNESSES
INVENTOR

UNITED STATES PATENT OFFICE.

LAWRENCE S. SCHMIDT, OF CORAOPOLIS, PENNSYLVANIA, ASSIGNOR OF ONE-HALF TO ROSCOE T. McCORMICK, OF IRWIN, PENNSYLVANIA.

WELDED JOINT.

1,158,307.  Specification of Letters Patent.  Patented Oct. 26, 1915.

Application filed December 15, 1914. Serial No. 877,372.

*To all whom it may concern:*

Be it known that I, LAWRENCE S. SCHMIDT, a citizen of the United States, residing at Coraopolis, in the county of Allegheny and State of Pennsylvania, have invented a new and useful Improvement in Welded Joints, of which the following is a full, clear, and exact description, reference being had to the accompanying drawings, forming part of this specification, in which—

Figure 1 is a plan view of a portion of a welded structure having joints made in accordance with my invention. Fig. 2 is a detail sectional view through one of the joints, taken on the line II—II of Fig. 1. Fig. 3 is a similar view, but showing a modified form of joint, and Figs. 4, 5, 6, 7, 8 and 9 are plan views showing various modifications of the joint.

My invention has relation to welded joints and is designed to provide a joint of this character which will have a maximum strength by reason of the fact that at least a portion of the metal forming the joint is in compression, instead of in tension, under stresses tending to separate the joint. I accomplish this object by so constructing the edge portions of the parts to be united that certain portions of one of the pieces will overlie or lap complementary portions of the other piece in such a manner that the interposed filling constituting the joint is placed in compression.

My invention is subject to various modifications in its details, and some of the forms thereof will now be described.

In Fig. 1 I have shown a part of a structure formed of a number of separate metal plates or sheets 2 united by welded joints 3. The welding edge of each plate or sheet 2 is formed with a series of alternating dovetailed projections 4 and recesses 5, the projections 4 of one sheet fitting loosely within the recesses of the other sheet, in the manner shown, with a sufficient space 6 between the adjacent edges of the parts to receive the filling material 7 which is flowed in in any suitable manner, as by the oxy-acetylene or electric method. For relatively thin sheets, the adjacent joint-forming edges may be scarfed or beveled as indicated at 8 in Fig. 2 to form a trough to receive the filling. With thicker plates the beveling may be from each side toward the center, as indicated at 9 in Fig. 3, and filling metal 10 flowed in from both sides.

It will be readily seen that that portion 7ª of the filling metal between the dovetailed sides of adjacent interfitting projections will be under compression when subject to stresses tending to separate the joint. This, of course, greatly increases the strength and the efficiency of the joint, and enables a joint to be made whose strength will approximate that of the metal itself, since the filling metal used may be of substantially the same character as the metal of which the welded parts are constituted.

In the modification shown in Fig. 4 the interfitting projections 11 and recesses 12 are of T-form.

In the modification shown in Fig. 5 the projections 13 and recesses 14 are of general T or headed form, but with the incurved surfaces 15 at the sides thereof.

In the construction shown in Fig. 6 the projections 16 and recesses 17 have corrugated lateral edges or walls, as shown at 18.

Fig. 7 shows a modification in which the edge portions of each of the sheets to be welded are formed with dovetailed recesses 19 placed oppositely to each other with correspondingly dovetailed key members 20 in said recesses and extending across the line of the joint.

Fig. 8 shows a form in which the projections 21 and recesses 22 are generally similar to those shown in Fig. 1, but with a much greater angularity of their sloping sides; whereas in Fig. 9 the corresponding projections 23 and recesses 24 have a comparatively slight angularity and are capable of being applied to each other edge to edge. That is to say, the recesses are sufficiently larger than the projections to permit the latter to be inserted endwise into the recesses.

My invention is susceptible to various other modifications in the form of interfitting recesses and projections, the object in each case being to increase the strength of the joint by reason of the large increase in the shearing area due to the irregular form of joint.

My invention is applicable generally to a large class of welding operations and gives a greatly superior joint.

I claim:

1. A welded joint in which the parts united by the weld have interfitting portions extending across the general line of the joint, and an interposed filling material between and welded to the adjacent edges of said portions, substantially as described.

2. A welded joint in which the parts united by the weld have interfitting portions extending across the general line of the joint, and an interposed filling material extending continuously between and welded to the adjacent edges of said portions, substantially as described.

3. A welded joint in which the parts united by the weld have interfitting portions extending across the general line of the joint, and an interposed filling material between and welded to the adjacent edges of said portions, said interfitting portions having complementary dovetailed or undercut edges, substantially as described.

4. A welded joint in which the parts united by the weld have interfitting portions extending across the general line of the joint, and an interposed filling material between and welded to the adjacent edges of said portions, the edges of said interfitting portions being scarfed to form troughlike cavities for the reception of said filling material, substantially as described.

5. A butt-welded joint in which the united edges of the parts have interfitting portions extending across the general line of the joint, said portions being initially separated from each other and united by a filling material which fills the space between and is welded to said edges, said interfitting recesses and projections being dovetailed, substantially as described.

In testimony whereof, I have hereunto set my hand.

L. S. SCHMIDT.

Witnesses:
 GEO. B. BLEMING,
 GEO. H. PARMELEE.